March 31, 1959     W. L. JOHNSON     2,879,910
MATERIAL UNLOADING AND ELEVATING ATTACHMENT FOR TRUCKS
Filed March 4, 1957
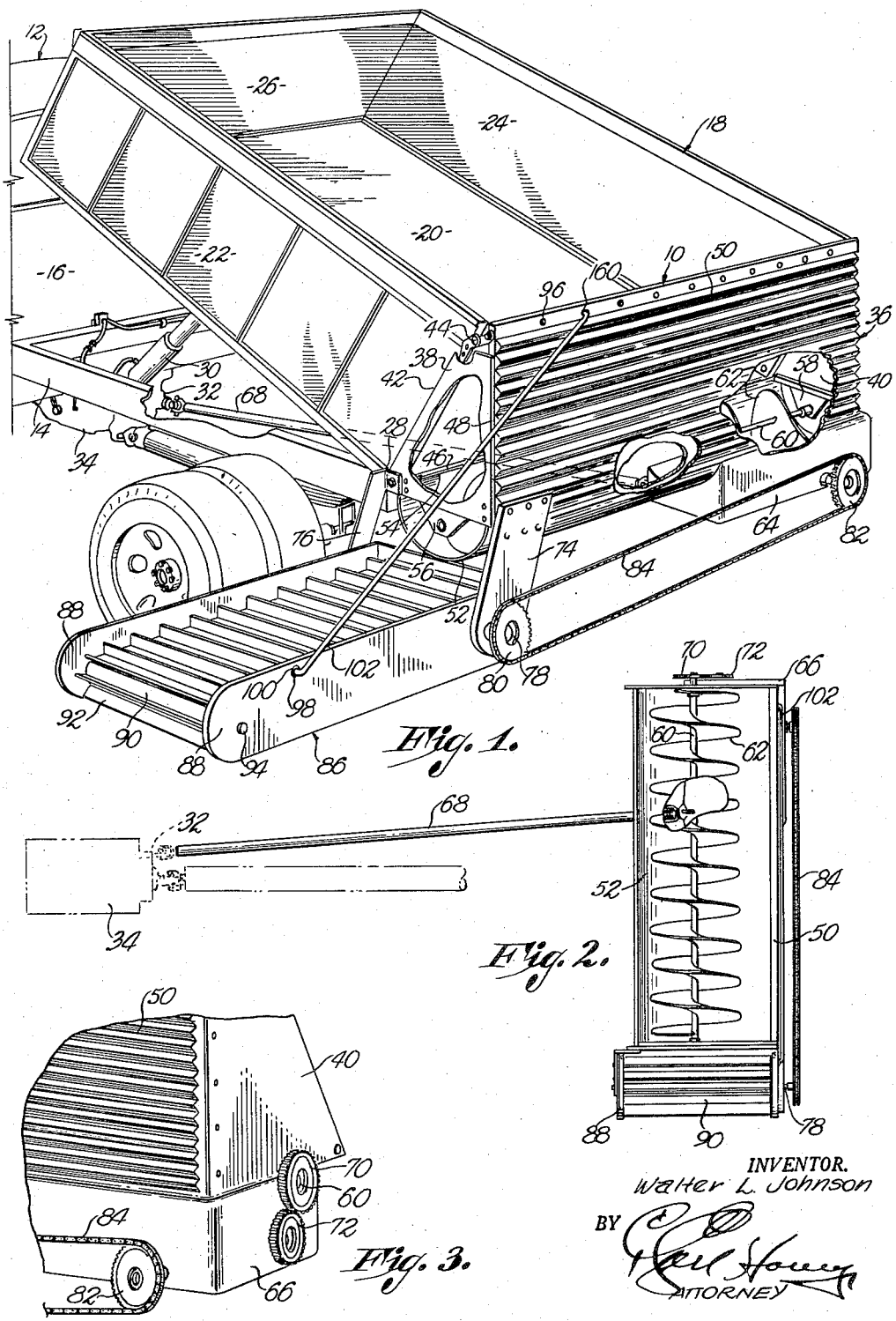
INVENTOR.
Walter L. Johnson
BY
ATTORNEY هذه الصفحة # United States Patent Office 2,879,910
Patented Mar. 31, 1959

2,879,910

MATERIAL UNLOADING AND ELEVATING ATTACHMENT FOR TRUCKS

Walter L. Johnson, Emmett, Kans.

Application March 4, 1957, Serial No. 643,707

7 Claims. (Cl. 214—508)

This invention relates to automatic vehicle unloading equipment, and more particularly, to a material unloading and elevating attachment adapted to be mounted on a mobile vehicle of the dump-truck-type.

The most important object of this invention is to provide a material unloading and elevating attachment adapted to be mounted on the rear or outermost end of a dump truck in lieu of the conventional tailgate and which performs the function of automatically unloading material from the bed of the truck while the operator remains in the cab of the vehicle.

A further important object of this invention is to provide a truck attachment as described above wherein there is provided means for removing material from the bed of the truck and conveying the same to a plurality of points lying in a vertical plane to one side of and remote from the bed.

An equally important object of this invention is to provide such unloading and elevating structure wherein the means for conveying the material from the bed to a point at one side of and remote from the latter, may be elevated to a plurality of predetermined positions and after the unloading operation has been concluded, may be folded up into an inoperative position against the truck bed.

Also an important object of this invention is to provide a material unloading and elevating attachment for dump trucks which is detachably mounted on the open rear end of the truck bed in a manner so as to be disposed in a substantially horizontal plane when the truck bed is tilted to its "dump" position.

Other important objects of the instant invention include the way in which an endless conveyor or belt is mounted on the detachable unloading structure by virtue of a driven shaft which serves to drive the belt while the mechanism for supporting the belt is freely pivotal on the shaft; the way in which means is provided for selectively securing the endless conveyor mechanism for delivering the material from the truck bed to a point to one side of the bed in a plurality of predetermined positions lying in a vertical plane; the way in which structure is provided to prevent escape of material from the bed when the latter is moved to its tilted position; the way in which an auger conveyor is provided in the detachable structure so that all types of material contained within the truck bed will be effectively transferred laterally from the bed; the way in which the auger conveyor and the endless belt may be simultaneously driven at predetermined speeds by the power take-off of the truck; and other less important objects and details of construction which will become manifest or be explained more fully hereinafter.

In the drawing:

Figure 1 is a fragmentary, perspective view illustrating a material unloading and elevating attachment for dump trucks and embodying the concepts of the instant invention, certain parts being broken away to reveal details of construction.

Fig. 2 is a plan view of an attachment made pursuant to this invention and showing the same detached from the truck, the endless conveyor mechanism being disposed in its upright inoperative position against the end-gate structure and certain elements being broken away to illustrate details of construction, the power take-off and transmission of the truck being shown in phantom to illustrate novel aspects hereof; and Fig. 3 is a fragmentary, perspective view of one corner of the material unloading and elevating attachment showing means for driving one of the conveyors.

A material unloading and elevating attachment designated broadly by the numeral 10, is particularly adapted to be mounted on a mobile vehicle such as dump truck 12 which conventionally includes an elongated frame 14, a cab 16 mounted on the forward part of frame 14, and a material receiving bed designated broadly by the numeral 18, carried by the rear portion of frame 14.

In vehicles of this type, bed 18 most usually has a flat bottom 20, vertical side walls 22 and 24 respectively, and an innermost end wall 26. The end 28 of bed 18 is pivotally mounted on frame 14 and, by virtue of the provision of hydraulic cylinder 30, the innermost end of bed 18 may be moved substantially vertically from frame 14 to cause tilting of the bed 18 with respect to frame 14. Although these types of trucks usually have a swingable endgate, such gate has been removed in Figure 1 of the drawing and attachment 10 has been detachably mounted on bed 18 in lieu of the above noted conventional tailgate. It should be noted that truck 12 is also provided with a power take-off 32 on transmission 34.

Attachment 10 is adapted to be mounted on the rearmost portion of bed 18 in closing relationship to the open end thereof and includes endgate structure 36 which includes a pair of identical triangular sections 38 and 40, the innermost marginal edge 42 of each of the sections 38 and 40 respectively being substantially co-extensive in length with the vertical height of the side walls 22 and 24 and from Figure 1 of the drawing it can be perceived that the innermost marginal edges 42 are detachably secured to adjacent marginal edges of corresponding side walls 22 and 24 respectively. Various means may be employed for attaching sections 38 and 40 to side walls 22 and 24 respectively, but bolt means such as 44 are suitable.

From Figure 1 it is apparent that each of the sections 38 and 40 describe right triangles with the acute angles being located at the uppermost end of bed 18 and the outermost edge 46 of bottom 20. In this manner it can be readily recognized that when the sections 38 and 40 are disposed on sides 22 and 24 respectively, that the marginal edges 48 of each of the sections 38 and 40 respectively, lie in a common plane which is substantially vertical to the ground when bed 18 is tilted to its dumping position.

Secured to the sections 38 and 40 adjacent marginal edges 48 and spanning the distance therebetween, is a substantially rectangular end plate 50 which may be secured to sections 38 and 40 by various means such as screws or the like. Disposed below sections 38 and 40 and in plate 50, is an elongated channel member 52 which is substantially semi-circular in transverse cross section. The outermost longitudinal edge of channel 52 is joined to the lowermost longitudinal edge of plate 50 and also opposed ends of the member 52 are joined to sections 38 and 40. Thus, it can be seen that when attachment 10 is mounted on bed 18, the longitudinal edge 54 of channel 52 is in substantial longitudinal alignment with edge 46 of bottom 20.

From the foregoing it can be readily appreciated that plate 50 and channel 52 may be constructed of a single piece of metal so as to present an integral construction and in many instances this is preferred.

Secured to the lowermost portions of each of the sections 38 and 40 respectively, is a pair of triangular supports 56 and 58 which contain bearings for journaling a rotatable conveyor shaft 60 which extends beyond section 40 at that end thereof. Disposed on conveyor shaft 60 is a helix or auger 62, shaft 60 being positioned so that the edges of helix 62 are in wiping engagement with the innermost face of channel member 52. Located beneath channel 52 and suitably secured thereto at the end of attachment 10 adjacent section 40, is a gear housing box 64 which has an end face 66 which also serves the purpose of closing the corresponding open end of channel 52.

As is illustrated, the gear housing 64 is preferably made to conform with the circular configuration of channel 52 so as to preclude entry of any foreign material into the housing. Suitable gears (not shown) are disposed within housing 64 and there is provided an elongated power shaft 68 which is adapted to be detachably secured to the power take-off 32 by suitable universal connections and also to the gears in housing 64. As illustrated in Fig. 3 of the drawing, an external toothed gear 70 is secured to the outermost end of shaft 60 and also an external toothed gear 72 is operably connected to the gears contained within housing 64, gears 70 and 72 being disposed in an intermeshing position.

Secured to attachment 10 adjacent section 38, are a pair of spaced, depending mounting plates 74 and 76 respectively which rotatably receive in suitable bearings, a substantially horizontal driven shaft 78. The shaft 78 extends beyond the outermost face of depending mounting plate 74 and has mounted thereon a sprocket wheel 80. A second similar sprocket wheel 82 is operably connected to the gears in housing 64 and an endless chain 84 trained over sprockets 80 and 82 respectively interconnect the same.

Elongated endless conveyor mechanism designated broadly by the numeral 86, is provided on attachment 10 adjacent section 38 and includes a pair of parallel, spaced, elongated runners 88 which are mounted on shaft 78 so as to be freely rotatable thereon. In this respect, it can be understood that each of the runners 88 contain a bearing (not shown) which receive shaft 78 so that mechanism 86 may be rotated about shaft 78 without interfering with the relative rotation of the shaft. Mounted on mechanism 86 between the runners 88 is an endless belt 90 having a plurality of spaced paddles 92 disposed thereon and trained over suitable wheels (not shown) located on shafts 94 and 78 respectively. From the foregoing it can be appreciated that inasmuch as the wheels on shaft 78 are secured thereto and rotate therewith, belt 90 will be rotated in a direction with, and at a speed equal to the relative rotation of sprockets 82 and 80.

Plate 50 is provided with a plurality of spaced openings 96 in the uppermost edge along the longitudinal length thereof and a perforation 98 is also provided in the rearmost runner 88, the openings 96 and perforation 98 being adapted to receive the laterally extending portion 100 of an elongated rod 102.

Material unloading and elevating attachment 10 is adapted to be mounted on bed 18 so that material contained within bed 18 may be unloaded by the operator of truck 12 without the necessity of his leaving cab 16.

From the foregoing description it can be perceived that upon upward tilting of the innermost end of bed 18 by extension of hydraulic cylinder 30, material contained within bed 18 will gravitate toward the rearmost portion of bed 18 and will fill channel member 52. Upon actuation of the power take-off 32 by the operator of truck 12, power shaft 68 will revolve therewith, turning the gears contained within housing 64 which in turn rotates shaft 60 by virtue of intermeshed gears 70 and 72 and belt 80 operably connected to shaft 78 which is rotatably interconnected with sprocket 82.

Thus, material contained in channel member 52 will be conveyed laterally from bed 18 by the helix 62 and be discharged from channel member 52 adjacent section 38. There the material is deposited on constantly moving endless belt 90 and thence conveyed or delivered to a point lying in a vertical plane to the side of, and remote from, bed 18. Since conveyor mechanism 86 may be rotated about shaft 78, it is manifest that the material may be deposited at a plurality of points of differing elevation with respect to the ground.

Means for selectively controlling the relative elevation of the outermost end of conveyor mechanism 86, takes the form of rod 102, the laterally extending portion 100 being placed in a suitable opening 96 which will hold the outermost end of conveyor mechanism 86 in a suitable position. Manifestly, the height of the outermost end of conveyor mechanism 86 from the ground will depend upon which opening 96, portion 100 is placed in, the farther to the right that extension 100 is moved toward section 40, the higher the outermost end of mechanism 86 will be disposed. It is to be noted that if the portion 100 of rod 102 is placed in the opening 96, proximate to section 40, mechaism 86 will be disposed in a substantially vertical plane and thus placed in an inoperative position when the truck 12 is being driven between unloading operations.

The instant invention is adapted to unload various types of materials but is most suitable for farm use or the like wherein it is necessary to transport various grains and then unload the same into suitable bins or bunks. It is manifest that the attachment 10 performs this function in a unique and highly efficient manner by quickly and easily conveying the grain from bed 18 to a bunk or bin without the operator having to leave the cab 16 of truck 12.

Having thus described the invention what is claimed as new and desired to be secured by Letters Patent is:

1. In a material unloading and elevating attachment for mobile vehicles of the type having an elongated frame, there being a cab and an elongated, normally horizontal, material-receiving bed disposed on the frame, said bed having a flat bottom, the outermost end of the latter being pivotally attached to the frame whereupon the bed tilts upon upward movement of the innermost end thereof, the outermost end of the bed being open and said vehicle having a driven power take-off, the combination with said bed and power take-off of endgate structure detachably mounted on said open end of the bed for movement with the latter and disposed in substantially closing relationship thereto, said structure being provided with end plate means disposed angularly with respect to said bed and defining an elongated opening between the plate and said bottom of the bed; conveyor means carried by the structure in closing relationship to said opening and disposed to be positioned substantially horizontally when the bed is in its tilted position for conveying the material in said bed laterally therefrom and delivering the same to a point at one side of the structure; a shaft carried by the structure on said one side thereof and substantially parallel with the major plane of said conveyor means; mechanism pivotally mounted on the shaft in parallelism therewith for receiving the material conveyed thereto by said means and including delivery means extending laterally therefrom in longitudinal alignment with said conveyor means for delivering the material to any one of a plurality of points remote from the bed; means operably connecting the delivery means to said shaft; and means attached to said structure and adapted to be operably coupled to said power take-off for simultaneously driving said conveyor means and the shaft at predetermined speeds.

2. In a material unloading and elevating attachment for mobile vehicles of the type having an elongated frame, there being a cab and an elongated, normally horizontal, material-receiving bed disposed on the frame, said bed having a flat bottom, the outermost end of the latter being pivotally attached to the frame whereupon the bed tilts upon upward movement of the innermost end thereof, the outermost end of the bed being open and said vehicle having a driven power take-off, the combination with said bed and power take-off of endgate structure detachably mounted on said open end of the bed for movement with the latter and disposed in substantially closing relationship thereto, said structure including a pair of parallel, spaced side sections attached to the bed and an end plate mounted on said sections, spanning the distance therebetween, disposed angularly with respect to said bed and defining an elongated opening between the plate and said bottom of the bed, there being an elongated channel member mounted on and extending between the lowermost ends of said sections, one longitudinal marginal edge of the channel being joined to the lowermost edge of the end plate, the other longitudinal edge of the member being in substantial longitudinal alignment with and adjacent to the outermost edge of the bottom, said edges lying in a substantially horizontal plane when the bed is tilted; a helix conveyor carried by the structure and disposed in said channel for conveying the material in said bed laterally therefrom and delivering the same to a point at one side of the structure when the bed is disposed in said tilted position; a shaft carried by the structure on said one side thereof and substantially parallel with the plane through said edges of the channel; an elongated, endless conveyor mechanism pivotally mounted on said shaft in parallelism therewith for receiving the material conveyed thereto by said helix conveyor and including an endless belt for delivering the material to any one of a plurality of points lying in a vertical plane remote from the bed; means operably connecting the belt to said shaft; a gear box carried by the structure; means adapted for operably coupling the gear box to said power take-off; and means on said structure operably coupling the helix conveyor and the shaft to said gear box for simultaneously driving the same at predetermined speeds.

3. In a material unloading and elevating attachment for mobile vehicles of the type having an elongated frame, there being a cab and an elongated, normally horizontal, material-receiving bed disposed on the frame, said bed having a flat bottom, the outermost end of the latter being pivotally attached to the frame whereupon the bed tilts upon upward movement of the innermost end thereof, the outermost end of the bed being open and said vehicle having a driven power take-off, the combination with said bed and power take-off of endgate structure detachably mounted on said open end of the bed for movement with the latter and disposed in substantially closing relationship thereto, said structure including a pair of parallel, spaced side sections attached to the bed and an end plate mounted on said sections, spanning the distance therebetween, disposed angularly with respect to said bed and defining an elongated opening between the plate and said bottom of the bed, there being an elongated channel member mounted on and extending between the lowermost ends of said sections, one longitudinal marginal edge of the channel being joined to the lowermost edge of the end plate, the other longitudinal edge of the member being in substantial longitudinal alignment with and adjacent to the outermost edge of the bottom, said edges lying in a substantially horizontal plane when the bed is tilted; an elongated, rotatable conveyor shaft extending longitudinally of the channel member; bearing means carried by each of the sections respectively for rotatably supporting said shaft; a helix conveyor mounted on said shaft with the edges thereof in engagement with the innermost face of the channel member for conveying the material in said bed laterally therefrom and delivering the same to a point at one side of the structure when the bed is disposed in said tilted position; a pair of spaced, depending mounting plates carried by the structure adjacent said one side thereof; a driven shaft rotatably carried by the plates and substantially parallel with the plane through said edges of the channel; an elongated endless conveyor mechanism mounted on said driven shaft in parallelism therewith and freely rotatable thereon; an endless delivery belt mounted on said mechanism and including means operably coupling the belt with the driven shaft, said belt receiving the material from the helix conveyor and delivering the same to any one of a plurality of points lying in a vertical plane remote from the bed; a gear box carried by the structure; means adapted for operably coupling the gear box to said power take-off; and means on said structure operably coupling said shaft to the gear box for simultaneously driving the same at predetermined speeds.

4. In an attachment as set forth in claim 3 wherein said means for operably coupling the shafts to said gear box includes a sprocket wheel on the driven shaft, a sprocket wheel operably connected to said gear box, and an endless chain trained over said sprocket whereby said mechanism may be rotated about the driven shaft without interfering with the relative rotation of said belt.

5. In an attachment as set forth in claim 3 wherein said means for operably coupling the shaft to said gear box includes a toothed gear secured to said conveyor shaft, and a toothed gear operably connected to said gear box, said gears being disposed in intermeshing relationship.

6. In an attachment as set forth in claim 3 wherein there is provided means for selectively securing the mechanism in any one of a plurality of predetermined positions.

7. In an attachment for unloading material from a container and elevating the same to a desired height, structure including conveyor means for conveying the material in the container laterally therefrom and delivering the same to a point at one side of the structure; a substantially horizontal shaft carried by the structure at said one side thereof; elongated mechanism mounted on the shaft and freely rotatable thereon, said mechanism including endless delivery means for delivering the material to any one of a plurality of points lying in a vertical plane remote from the container, there being means operably coupling the delivery means to said shaft; and power means coupled to said conveyor means and said shaft for simultaneously driving the same at predetermined speeds, whereby the mechantism is swingable about the shaft without interfering with relative rotation of the latter.

References Cited in the file of this patent

UNITED STATES PATENTS

| | | |
|---|---|---|
| 2,102,432 | Nesseth | Dec. 14, 1937 |
| 2,155,423 | Korsmo | July 25, 1939 |
| 2,360,069 | Marvin | Oct. 10, 1944 |
| 2,534,558 | Ottenbacher | Dec. 19, 1950 |